United States Patent [19]
Rungta et al.

[11] Patent Number: 5,460,895
[45] Date of Patent: Oct. 24, 1995

[54] CORROSION-RESISTANT ALUMINUM ALLOY

[75] Inventors: Ravi Rungta; Muftau M. Alabi, both of East Amherst, N.Y.

[73] Assignee: General Motors Corporation, Detroit, Mich.

[21] Appl. No.: 251,810

[22] Filed: May 31, 1994

Related U.S. Application Data

[63] Continuation-in-part of Ser. No. 76,223, Jun. 14, 1993, abandoned.

[51] Int. Cl.⁶ .......................... B32B 15/20; F28F 21/08; B23K 103/10
[52] U.S. Cl. .................... 428/654; 228/262.51; 165/905
[58] Field of Search ............................. 428/654; 420/533, 420/534, 535, 529; 228/263.17, 262.51; 165/133, 134.1, 905

[56] References Cited

U.S. PATENT DOCUMENTS

| | | | |
|---|---|---|---|
| 4,357,397 | 11/1982 | Baba et al. | 428/654 |
| 4,975,243 | 12/1990 | Scott et al. | 420/534 |
| 5,072,789 | 12/1991 | Usui et al. | 165/134.1 |
| 5,176,205 | 1/1993 | Anthony | 165/133 |
| 5,240,519 | 8/1993 | Kamio et al. | 148/415 |
| 5,377,901 | 1/1995 | Rungta et al. | 228/183 |

FOREIGN PATENT DOCUMENTS

| | | | |
|---|---|---|---|
| 352476 | 1/1986 | Germany | 420/533 |
| 55-131152 | 10/1980 | Japan | 420/530 |

*Primary Examiner*—John Zimmerman
*Attorney, Agent, or Firm*—George A. Grove

[57] ABSTRACT

An improved aluminum alloy stock material is provided for use in a tubeplate-and-center type evaporator within an automobile air conditioning system. The improved aluminum alloy stock contains a unique aluminum alloy core material which is clad on both sides with an appropriate aluminum-silicon brazing alloy. The inventive aluminum alloy core material is characterized by the presence of boron in amounts sufficient to inhibit the formation of copper-rich precipitates in the grain boundaries of the alloy, so as to enhance the ability of the alloy to resist intergranular corrosion. The alloy is also characterized by a higher copper concentration and lower manganese and titanium concentrations as compared to conventional aluminum alloys used in these types of aluminum alloys.

10 Claims, 6 Drawing Sheets

CORROSION-RESISTANT ALUMINUM ALLOY

CROSS REFERENCE TO RELATED APPLICATION

This patent application is a continuation-in-part patent application of U.S. Ser. No. 08/076,223 filed Jun. 14, 1993, now abandoned.

The present invention is directed to an improved aluminum stock material used to form tubeplate-type evaporator units for an automotive air conditioning system. More particularly, this invention relates to such an aluminum stock material which is characterized by a core layer of an improved aluminum alloy that is clad on both sides with an appropriate aluminum-silicon brazing alloy, wherein the clad aluminum stock material is characterized by enhanced resistance to intergranular corrosion as compared to conventional materials as a result of the addition of free boron to the aluminum alloy.

BACKGROUND OF THE INVENTION

Air conditioning systems used in automobiles and other vehicles conventionally include an evaporator unit into which a cooled liquid refrigerant is sprayed so as to revaporize the refrigerant. The heat of vaporization required for vaporizing the refrigerant is drawn from the incoming outside air, which is blown around the evaporator. So as to maximize the amount of surface area available to the incoming air and, correspondingly, to more efficiently cool and dry that air, the design of the evaporator unit is typically a tubeplate-and-air center type heat exchanger containing flat ribbed tubes, similar to the tube-and-fin type designs.

The evaporator is assembled by stacking and brazing together matching clad aluminum sheet components, referred to as tubeplates. Each tubeplate is formed from an aluminum brazing stock material which has been stamped so as to define an internal passage through the evaporator when properly mated with another tubeplate. The evaporator unit is then formed by stacking and brazing a number of tubeplates together.

Due to the numerous brazements which must be formed, it is most efficient to braze the tubeplates during a single brazing operation. Generally, this is accomplished by forming the tubeplates from an aluminum alloy brazing stock material. A typical brazing stock material consists of, for example, an appropriate aluminum alloy core which has been clad on both sides with an aluminum-based brazing alloy. Typically, the cladding layers are an aluminum-silicon eutectic brazing alloy characterized by a melting point lower than the core aluminum alloy. Therefore, the clad layers of brazing alloy melt during the vacuum brazing operation and flow toward the desired joint regions and, upon cooling, solidify to form the brazements. The core aluminum alloy does not melt during the brazing operation and thereby constitutes the structural part of the tubeplate-and-center type evaporator.

In the past, the aluminum alloy brazing stock material routinely used to form these types of plate-type evaporators has consisted of a core layer of aluminum alloy AA 3005, as designated by the Aluminum Association (AA), which has been clad on both sides by an aluminum-silicon brazing alloy, such as aluminum alloy AA 4047. Generally speaking, this particular aluminum alloy brazing stock material has performed satisfactorily over the years. In particular, the material is easily stamped for formation of the tubeplates, there are no inherent brazing difficulties associated with its use, and the structural integrity of the material is considered to be sufficient.

However, the corrosion resistance of evaporator units formed from this specific material is less than desired. Corrosion is particularly problematic if the tubeplates of the evaporator unit are exposed to long periods of wetness due to the use of a climate control switch within the passenger compartment of the automobile which automatically regulates the temperature of the incoming air. The corrosion problem associated with the AA 3005 alloy appears to be due not only to the presence of the condensate which is particularly aggressive to aluminum, but also the presence of sulfur and chloride compounds within the incoming air.

In the past, the corrosion resistance of an air conditioning evaporator formed from this conventional aluminum brazing stock material would typically be enhanced by coating the evaporator with a protective chromate layer. However, due to increased concerns about the environment, the industry is working to eliminate the use of this protective chromate coating because of the toxic byproducts produced by the process. Therefore, it would be preferable to eliminate the use of the chromate conversion process entirely.

U.S. Pat. No. 5,176,205 to Anthony, assigned to the assignee of this invention, significantly overcomes the corrosion problems associated with prior art aluminum alloy brazing stock materials, such as those which employ the AA 3005 alloy. Specifically, Anthony teaches an improved aluminum alloy brazing stock which contains an aluminum alloy core material characterized by a higher copper concentration and a lower manganese concentration as compared to the conventional aluminum alloy AA 3005. The higher concentration of copper within the aluminum alloy core material reduces the electrode potential differential between the core alloy and the aluminum-silicon brazing alloy, which is clad to the core alloy and which forms the multitude of brazements within the evaporator unit during the brazing operation. As a result, the electrochemical potential difference between the core alloy and the brazing alloy is minimized, such that the galvanic corrosion driving force between the two alloys is reduced.

A particularly advantageous feature of the alloy developed by Anthony is that an air conditioning evaporator unit formed from the alloy is characterized by enhanced corrosion resistance, as compared to the conventional AA 3005 aluminum alloy brazing stock material which has been treated with a protective chromate coating. Further, the strength of the alloy is sufficient to contain a high pressure refrigerant even over extended thermal cycling which is characteristic of an automotive environment.

However, further improvements in corrosion resistance are continuously being sought in the relevant industries to further enhance service life and durability. Such an improvement is disclosed in U.S. Ser. No. 08/052,975 to Rungta et al., filed Apr. 27, 1993, and also assigned to the assignee of this invention. This improvement involves rapidly quenching the evaporator unit immediately after brazing so as to substantially prevent the formation of copper-aluminum precipitates in the grain boundaries of the aluminum alloy core material. In accordance with the teachings of Ser. No. 08/052,975, it was discovered that unexpected and substantial improvements in the resistance of a 3000 series aluminum alloy to intergranular corrosion can be attained by appropriately processing such alloys to keep the relatively low level of copper in these alloys in solid solution, so as to inhibit the precipitation of $CuAl_2$ particles at the grain boundaries. Greater consistency in corrosion resistance was also attained by this method, so as to minimize the occurrence of premature failures of evaporator units made from these alloys. Finally, it was also determined that evaporator units formed by such processing methods exhibited enhanced mechanical properties, enabling the evaporator units to more readily withstand repeated thermal cycling within a typical automotive environment.

However, the implementation of such a quenching method within a manufacturing process cannot always be readily adopted, in that additional facilities are required to suitably quench the evaporator units as they leave the brazing furnace. Therefore, it would be desirable to provide a method for further enhancing the corrosion resistance of an evaporator unit, so as to survive the aggressive automotive environment, without the requirement to protect the evaporator unit with an additional protective chromate coating and without the requirement for quenching the evaporator unit immediately after the brazing process.

SUMMARY OF THE INVENTION

It is therefore an object of this invention to provide an improved clad aluminum alloy brazing stock material for use in an evaporator unit of an automobile air conditioning system.

It is another object of this invention that such an aluminum alloy brazing stock material contain a unique and improved aluminum alloy core material such that the aluminum alloy brazing stock material is characterized by an enhanced resistance to intergranular corrosion.

It is a further object of this invention that such an aluminum alloy core material be characterized by the presence of free boron, in which the free boron inhibits the precipitation of copper-rich phases at the grain boundaries of the aluminum alloy core material.

It is yet another object of this invention that the presence of free boron be made possible by maintaining the level of heavy metals such as zirconium, chromium, vanadium and titanium in the aluminum alloy core material at impurity levels of below about 0.008 weight percent.

In accordance with a preferred embodiment of this invention, these and other objects and advantages are accomplished as follows.

An improved aluminum alloy brazing stock material is provided which is suitable for use in an evaporator unit within an automobile air conditioning system. The improved aluminum alloy brazing stock contains a unique aluminum alloy core material that has been clad on at least one side, and preferably both sides, with an appropriate aluminum brazing alloy.

The preferred aluminum alloy core material of this invention is characterized by additions of boron, as well as a higher copper concentration and a lower manganese concentration in comparison to the conventional aluminum alloy AA 3005 generally used in these types of automotive evaporator units. The preferred aluminum alloy core material is preferably clad with the conventional aluminum-silicon brazing alloy AA 4047. In accordance with this invention, it has been determined that free boron—boron which is not tied with heavy metals to form borides—has the characteristic of diffusing quickly to the grain boundary, thereby inhibiting the precipitation of copper-rich phases at the grain boundaries of the alloy. Accordingly, the aluminum alloy core material of this invention is alloyed to ensure that free boron is present, necessitating that heavy metals be either absent from the alloy or maintained at suitably low levels to minimize the loss of free boron to the formation of heavy metal borides. Through the present invention, it has been determined that the affinity of free boron for grain boundaries results in lower amounts of copper-rich phases, and more particularly, copper-aluminum precipitates, at the grain boundaries, which corresponds to an improvement in the core alloy's ability to resist intergranular corrosion.

The preferred levels of copper and manganese employed by this invention are in accordance with the teachings of U.S. Pat. No. 5,176,205 to Anthony. Specifically, the higher concentration of copper within the aluminum alloy core material of this invention makes the alloy more noble and closer in potential relative to the electrode potential of the aluminum-silicon brazing alloy which is clad to the core alloy and which forms the multitude of brazements within the evaporator unit during the brazing operation.

A particularly advantageous feature of this invention is that an air conditioning evaporator unit formed from the preferred aluminum alloy brazing stock material is characterized by enhanced corrosion resistance, and particularly resistance to intergranular corrosion, as compared to the conventional aluminum alloy brazing stock material which has been treated with a protective chromate coating. Furthermore, the improved corrosion resistance attributed to the core alloy of this invention is not dependent on the cooling rate of the evaporator unit as it leaves the brazing furnace, such that the evaporator can be allowed to air cool at a rate of about 100° F. per minute or less, as is the conventional practice. Consequently, the implementation of this invention does not have any effect on the typical manufacturing process used to form vacuum-brazed evaporator units.

In addition, the preferred boron content of the core alloy has a minimal effect on mechanical properties such that the brazing stock material of this invention is sufficiently ductile to be stamped at room temperature into the intricate tubeplates which are brazed together to form the tubeplate-and-center type evaporator unit. Further, the strength of this brazing stock material is sufficient to contain a high pressure refrigerant even over extended thermal cycling, which is characteristic of an automotive environment.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which.

DETAILED DESCRIPTION OF THE INVENTION

According to the present invention, there is provided an improved aluminum alloy brazing stock material suitable for use in a tubeplate-and-center type (or tubeplate-type) evaporator unit within an automobile air conditioning system, which is characterized by enhanced resistance to intergranular corrosion, good formability, and sufficient strength over extended thermal cycling and use.

The aluminum alloy brazing stock material for formation of an evaporator unit, such as the tubeplate-type evaporator unit described above, includes the preferred aluminum alloy core material of this invention. A sheet of the preferred aluminum alloy core material, which forms the structural core of the aluminum alloy brazing stock material, is conventionally clad on both surfaces with an appropriate aluminum-based brazing alloy so as to form a sandwich-like structure, though it is foreseeable that alternate configurations could be adopted, such as the core alloy being clad with only a single layer of the aluminum-based brazing alloy. A preferred aluminum-silicon brazing alloy is AA 4047, which is an aluminum-silicon eutectic brazing alloy characterized by a melting range of about 1070° F. to about 1100° F. In contrast, the preferred aluminum alloy core material of this invention is characterized by a melting range of about 1170° F. to about 1210° F.

The preferred aluminum alloy core material is further characterized by the following elemental analysis, by weight: up to about 0.2 percent silicon (Si), up to about 0.4 percent iron (Fe), from about 0.4 to about 0.5 percent copper (Cu), from about 0.5 to about 0.9 percent manganese (Mn), from about 0.2 to about 0.6 percent magnesium (Mg), and from about 0.003 to about 0.04 percent boron (B), the balance of the alloy being aluminum (Al). In accordance with this invention, heavy metals such as zirconium (Zr), chromium (Cr), vanadium (V) and titanium (Ti) are preferably not present in the alloy so as to ensure that free boron is present within the alloy. These heavy metals will tend to precipitate out of the melt as borides, and therefore will not be present in the resultant alloy, although typical impurity amounts of up to about 0.008 weight percent titanium are foreseeable, as well as trace amounts of other heavy metals. Throughout the following description, percents will refer to weight percents within the composition of the aluminum alloy core material of this invention.

The more preferred ranges for the above constituents within the aluminum alloy core material of this invention are summarized in Table I below.

TABLE I

| Si | 0.15% (max) |
|---|---|
| Fe | 0.3% (max) |
| Cu | 0.4–0.5% |
| Mn | 0.7–0.8% |
| Mg | 0.5–0.55% |
| B | 0.003–0.024% |
| Ti | 0.008% (max) |
| Al | Balance |

While the above preferred composition and its corresponding properties are generally an unobvious modification of the aluminum alloy taught by U.S. Pat. No. 5,176,205 to Anthony, it is foreseeable that the teachings of this invention are applicable to all 3000 series aluminum alloys. Specifically, it is believed that the presence of free boron in 3000 series alloys, such as AA 3005, would also yield satisfactory results in terms of enhanced corrosion resistance.

As indicated above, the preferred range for the boron content within the aluminum alloy core material is about 0.003 to about 0.024 percent, while titanium is essentially excluded from the alloy. In accordance with the teachings of this invention, the preferred amounts of boron used in conjunction with the exclusion of heavy metals enables the boron present in the aluminum alloy core material to be free boron. Furthermore, it has been determined that the presence of free boron at these levels inhibits the precipitation of copper-rich phases at the grain boundaries of the alloy, and more particularly, the precipitation of copper-aluminum precipitates such as $CuAl_2$. The basis for this effect is apparently the affinity that free boron has for preferentially segregating to the grain boundaries of the aluminum alloy. It is believed that the ability of the free boron to inhibit the formation of copper-rich phases at the grain boundaries is presumably related to boron's high binding energy to vacancies, which ultimately influences precipitation kinetics. The consequence of a diminished presence of copper-aluminum precipitates at the grain boundaries results in the alloy being significantly more resistant to intergranular corrosion.

It is believed that the binding energy of an element with vacancies will change with the concentration of the element in the alloy. Generally, binding energy is highest in a narrow concentration range. For this reason, the maximum effect on intergranular corrosion resistance is believed to occur within the relatively narrow range of about 0.003 to about 0.04 weight percent for boron. In addition, at higher concentrations, boron-rich phases typically begin to form in the matrix which will affect the mechanical properties of the alloy, as well as the intergranular corrosion properties of the alloy.

The most preferred copper content within the aluminum alloy of this invention is about 0.4 to about 0.5 percent, and more preferably about 0.45 percent. Though this relatively high concentration of copper promotes the formation of the undesirable copper-aluminum precipitates, the presence of copper is beneficial for the purpose of enhancing corrosion resistance of the alloy through a different mode. Specifically, the presence of copper within the preferred core alloy of this invention makes the core alloy more noble and closer in potential relative to the electrode potential of the aluminum-silicon brazing alloy which is clad to the core material for the purpose of forming the multitude of brazements within the tubeplate-and-center type evaporator during the brazing operation. Optimal results appear to be achieved with a copper concentration of about 0.45 weight percent.

The optimal range of manganese within the preferred alloy can generally vary from about 0.7 to about 0.8 percent, with a manganese content of about 0.7 percent being most preferred. The presence of manganese within the preferred core alloy is useful since the manganese combines with the iron in the alloy so as to form the intermetallic compound, $(Mn,Fe)Al_6$. This intermetallic manganese-iron compound is characterized by an electrode potential closer to that of the aluminum matrix as compared to the iron-rich intermetallic compound, $FeAl_3$, which typically forms when manganese is not present. This iron-rich intermetallic compound is undesirable in that it is more noble than the aluminum matrix and thereby promotes a higher degree of pitting corrosion when present.

It is believed that if more than about 0.9 percent manganese is present, the ductility of the preferred core alloy is adversely affected. Thus, it is extremely difficult to successfully stamp sheets of the alloy into the desired tubeplates having an internal tubular configuration. In addition, it is also believed that if manganese is present in higher concentrations than about 0.9 percent within the alloy, it will impair the age hardening mechanism associated with the copper content in the alloy that leads to the development of good burst strength and thermal cycle endurance. The preferred aluminum alloy core material is characterized by a constitution which is effectively solution annealed by the vacuum brazing process. Under these conditions, the preferred core alloy develops a natural age hardening response which results in the superb thermal cycle endurance. Manganese in excess of 0.9 percent may cause the fine particles responsible for the age hardening response to combine into coarse manganese-rich particles which would be detrimental to the age hardening process. Therefore, it is preferred that the manganese concentration vary between about 0.7 and 0.8 percent, with about 0.7 percent being most preferred.

Iron concentration within the preferred aluminum alloy core material is most preferably no greater than about 0.3 weight percent. Because corrosion resistance of the aluminum core alloy is impaired by the presence of iron, it is desirable to minimize the presence of iron within the alloy. However, the detrimental effects due to the presence of iron are minimized by the presence of manganese within the alloy. As stated previously, manganese combines with iron to form a less deleterious phase than the $FeAl_3$ intermetallic phase, which is the normal combination between the iron and the aluminum.

The concentration of silicon within the preferred alloy may vary up to about 0.2 percent, with a content of up to about 0.15 percent being most preferred. Free silicon within the aluminum alloy, as well as aluminum-silicon intermetallic compounds, or alternatively aluminum-iron-silicon intermetallic compounds, are more noble relative to their electrode potentials than the aluminum matrix within the core alloy. Therefore, the presence of silicon in any of these forms may cause severe pitting corrosion. Thus, it is desirable to minimize the amount of silicon within the core alloy as practically as possible. Though it would be desirable to eliminate all of the silicon within the alloy, silicon is a normal impurity found within the primary aluminum used to form the alloy. It would be prohibitively expensive to require that the primary aluminum used to form the alloy contain much less than about 0.15 percent silicon, although a restriction of such would be preferred.

As noted above, titanium and other heavy metals are preferably not present in the alloy, though typical impurity amounts of up to about 0.008 weight percent titanium are anticipated and permissible. However, the presence of titanium is detrimental to the intergranular corrosion resistance of the alloy of this invention since the presence of titanium at conventional levels—for example, on the order of about 0.03 to about 0.05 weight percent—combines with boron to form the intermetallic compound titanium boride. As a result, the presence of titanium in the core alloy at conventional levels would substantially reduce the presence of free boron, even with the preferred boron content of about 0.003 to about 0.04 weight percent. It is believed that a titanium content of no more than about 0.008 weight percent will enable the presence of sufficient free boron in the alloy (i.e., boron which has not reacted with titanium to form titanium boride).

It should be noted that titanium and titanium boride are known grain refiners, as illustrated by U.S. Pat. No. 5,240,519 to Kamio et al. As is known to those skilled in the art, boron is inherently present in very small quantities within an aluminum alloy that employs titanium as a grain refiner. Conventional titanium-to-boron ratios used within aluminum alloys as grain refiners are between 3:1 and 5:1, with greater relative amounts of titanium often being preferred. At these levels, some of the titanium reacts with the boron present, such that essentially all of the boron is tied with the titanium as titanium boride to serve as nucleation sites for grains. Consequently, intergranular corrosion through the presence of copper precipitates at the grain boundaries has been found to occur in the aluminum alloy taught by Anthony, even when boron is present at levels of up to 0.01 weight percent, as taught by Kamio et al. In contrast, this invention dictates that free boron be present, whose purpose is not grain refinement but the minimization of the formation of Cu—Al precipitates at the grain boundary as a result of the affinity which free boron has for preferentially segregating at the grain boundaries of an aluminum alloy. Therefore, in accordance with this invention, the boron content of the core alloy must be sufficiently high, and the titanium content of the alloy must be sufficiently low, in order to assure the presence of free boron within the alloy—i.e., in excess of the conventional amounts of boron used with titanium as a grain refiner in aluminum alloys. Notably, lower Ti/B ratios as a result of increasing the boron content of an aluminum alloy have been deemed to be counterproductive to grain refining. Accordingly, the present invention is entirely contrary to prior art teachings concerning the use of titanium and boron in aluminum alloys. It is also worth noting that the presence of boron at levels taught by this invention in combination with conventional titanium levels used for grain refining, such as that taught by Kamio et al., causes sedimentation of both boron and titanium to occur while the alloy is molten. This undesirable result is believed to occur because the critical titanium-to-boron ratio has been violated. Such a result further emphasizes that titanium be preferably excluded from the core alloy of this invention.

The magnesium content within the preferred alloy range of about 0.5 to about 0.55 percent is advantageous since the magnesium acts as a getter during the brazing process. The magnesium vaporizes upon exposure to the elevated temperatures experienced during brazing and then scavenges residual oxygen from the environment so as to deter the development of a detrimental oxide film on the surface to be brazed.

The content of the remaining constituents of the preferred core alloy falls within the range of normal trace elements which occur during the smelting of the primary aluminum from bauxite prior to casting. These trace elements include up to about 0.1 percent chromium, up to about 0.01 percent nickel, and up to about 0.25 percent zinc. The balance of the preferred aluminum alloy core material is aluminum.

To evaluate the corrosion resistance of the preferred aluminum alloy core material of this invention, three small ingots were cast of the core alloy, as well as one ingot of the aluminum alloy taught by U.S. Pat. No. 5,176,205 to Anthony. The three ingots of the preferred core alloy were designated Alloy A, Alloy B and Alloy C, and cast to have a boron content of about 0.003, 0.012 or 0.024 percent, respectively, so as to cover the preferred range for boron in the core alloy. The ingot formulated in accordance with Anthony was designated Alloy D. The ingots were cast using known techniques, then conventionally homogenized at an elevated temperature of about 1110° F. for about 14 hours, which was sufficient to dissolve any segregation within the cast ingots. The ingots were then air cooled to room temperature.

Corrosion tests were conducted with these cast ingot samples to evaluate the degree to which the samples would be susceptible to intergranular corrosion. The following test has been found to be an excellent screening test for such purposes and enables a side-by-side qualitative evaluation of various alloys under essentially identical test conditions. The test involved dipping each of the ingot samples in a deaerated, 2% hydrochloric acid at room temperature for about 24 hours. Afterwards, the ingot samples were removed, cross sectioned, and metallographically prepared to determine the extent of intergranular corrosion attack.

The results of the test are illustrated by photomicrographs of the samples in FIGS. 1 through 4. While each of the ingot samples exhibited a degree of corrosion resistance, the photomicrographs clearly show that the boron-containing ingot samples formulated in accordance with this invention (Alloys A, B and C shown in FIGS. 1, 2 and 3, respectively) exhibited superior resistance to intergranular corrosion as compared to the sample formulated in accordance with U.S. Pat. No. 5,176,205 to Anthony (Alloy D, shown in FIG. 4). Furthermore, Alloys B and C, containing 0.012 and 0.024 weight percent boron and shown in FIGS. 2 and 3, respectively, appeared to exhibit the best corrosion resistance under the conditions of the test described above. The results of this corrosion test indicated that intergranular corrosion was significantly reduced or even eliminated in the aluminum alloy samples formulated with additions of boron as compared to the sample formulated without additions of boron.

The results presented above served a useful purpose in terms of narrowing the preferred range of boron. These results were developed on cast slugs that did not undergo the typical thermomechanical processing that production braze sheet undergoes. The next level of confirmation was achieved by manufacturing braze sheet with the preferred chemical composition of the core alloy, and then manufacturing automotive evaporators from the braze sheet using a braze cycle which includes a slow cooling stage after brazing. As such, the evaporators were not processed in accordance with U.S. patent application Ser. No. 08/052,975, noted previously, which teaches that rapid quenching of an evaporator unit immediately after brazing serves to substantially prevent the formation of copper-aluminum precipitates in the grain boundaries of the aluminum alloy core material, thereby enhancing resistance to intergranular corrosion.

Figure 1:
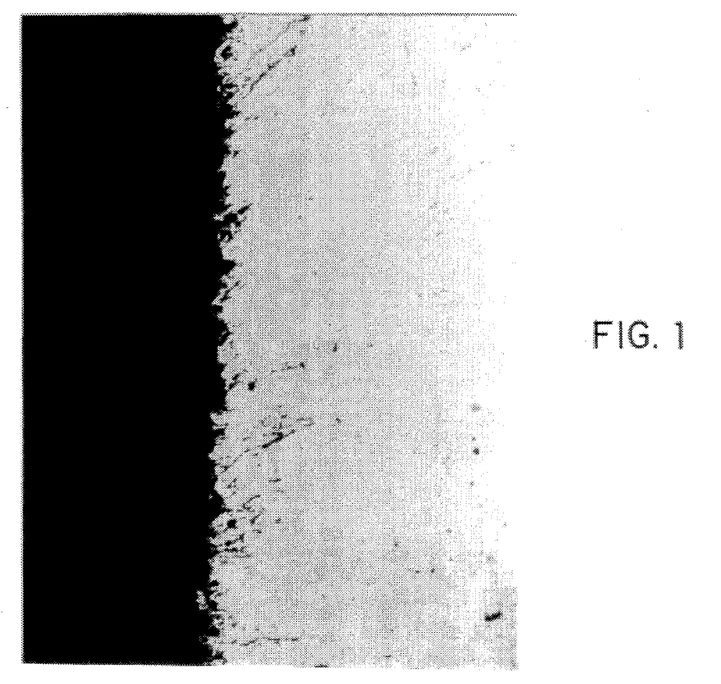
FIGS. 1 through 3 are photomicrographs illustrating the corrosion morphology of aluminum alloys containing about 0.003, 0.012 and 0.024 weight percent boron, respectively, in accordance with the present invention.
Figure 2:
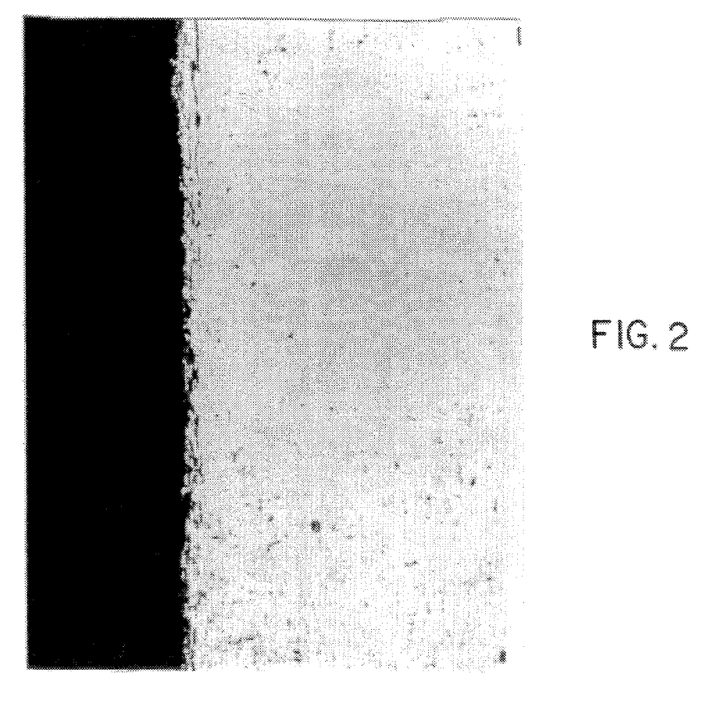
Figure 3:
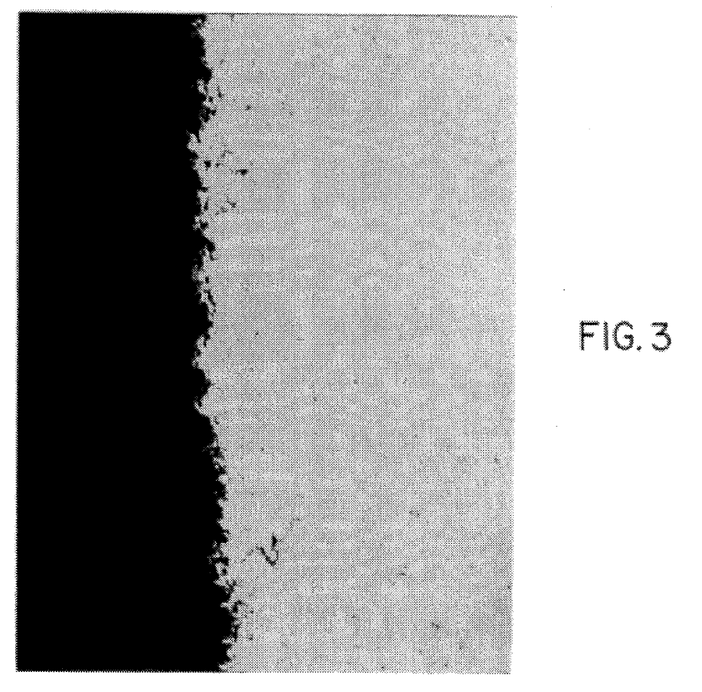
Figure 4:
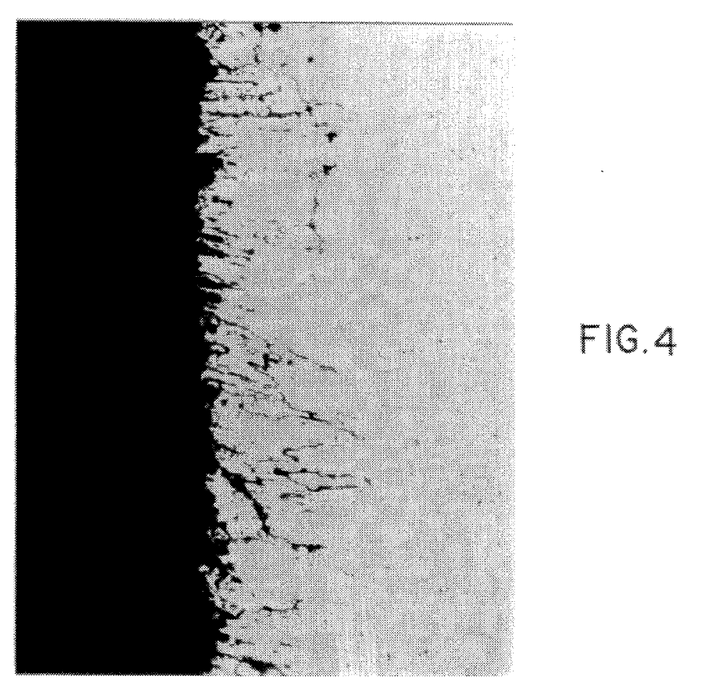
FIG. 4 is a photomicrograph illustrating the corrosion morphology of an aluminum alloy formulated in accordance with U.S. Pat. No. 5,176,205 to Anthony.
Figure 5:
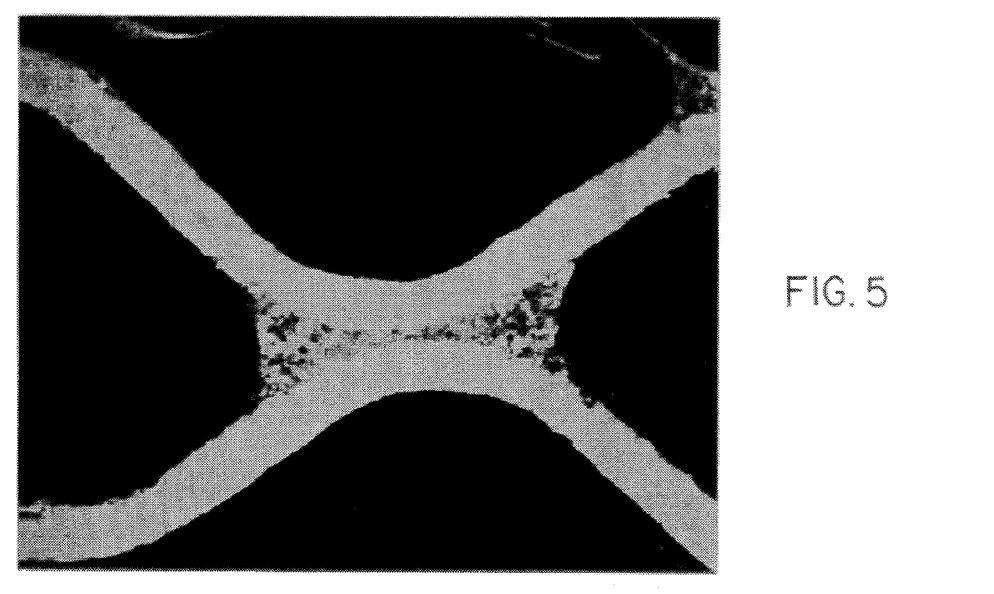
FIGS. 5 through 8 are photomicrographs of the Anthony alloy following slow cooling after brazing and an acid immersion test for a period of 24 and 48 hours, in which extensive intergranular attack of the alloy is evident.
Figure 6:
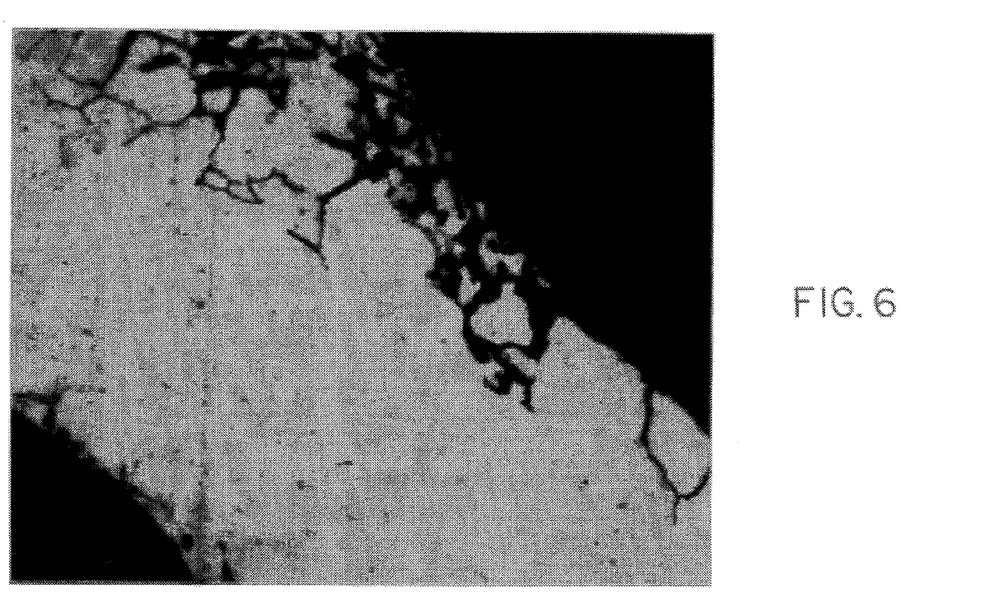
Figure 7:
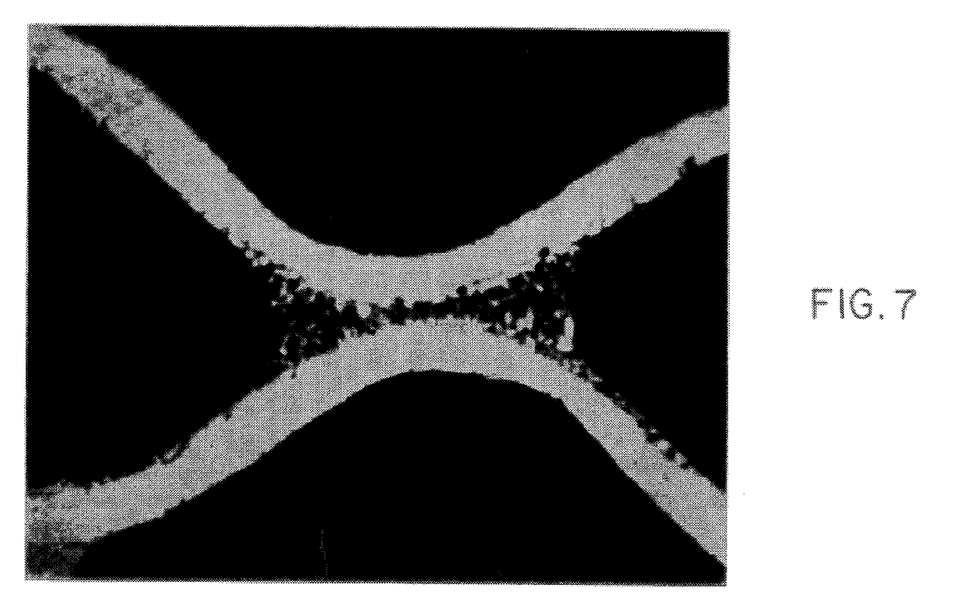
Figure 8:
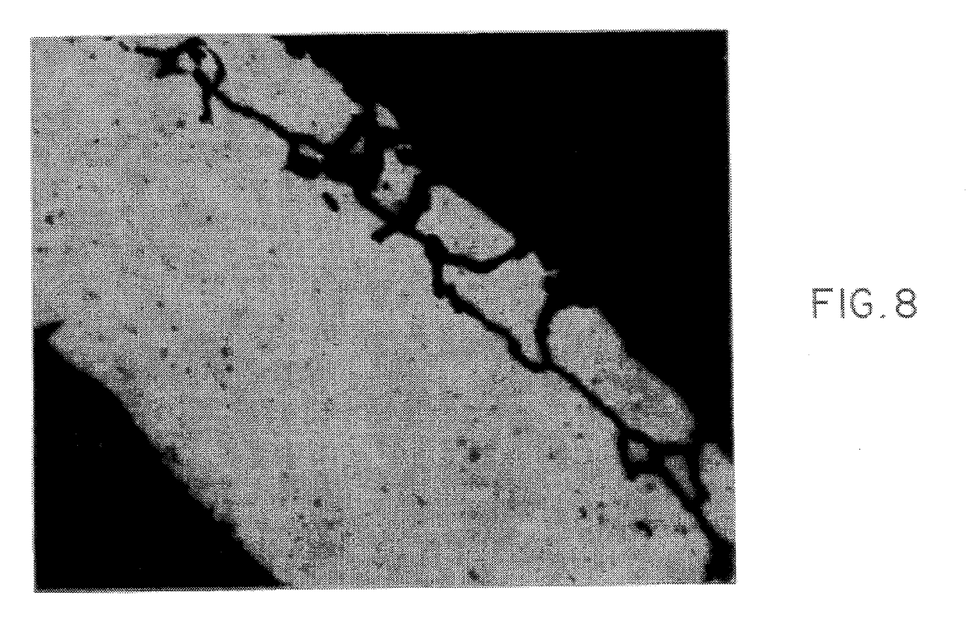
Figure 9:
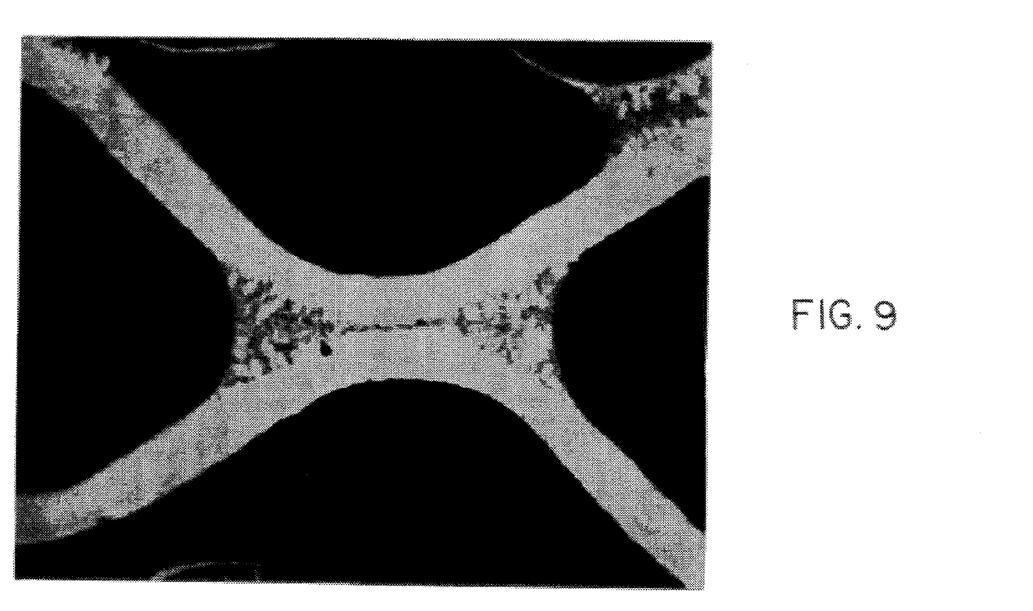
FIGS. 9 through 12 are photomicrographs of the alloy of this invention following slow cooling after brazing and an acid immersion test for a period of 24 and 48 hours, in which corrosion attack of the alloy is absent.
Figure 10:
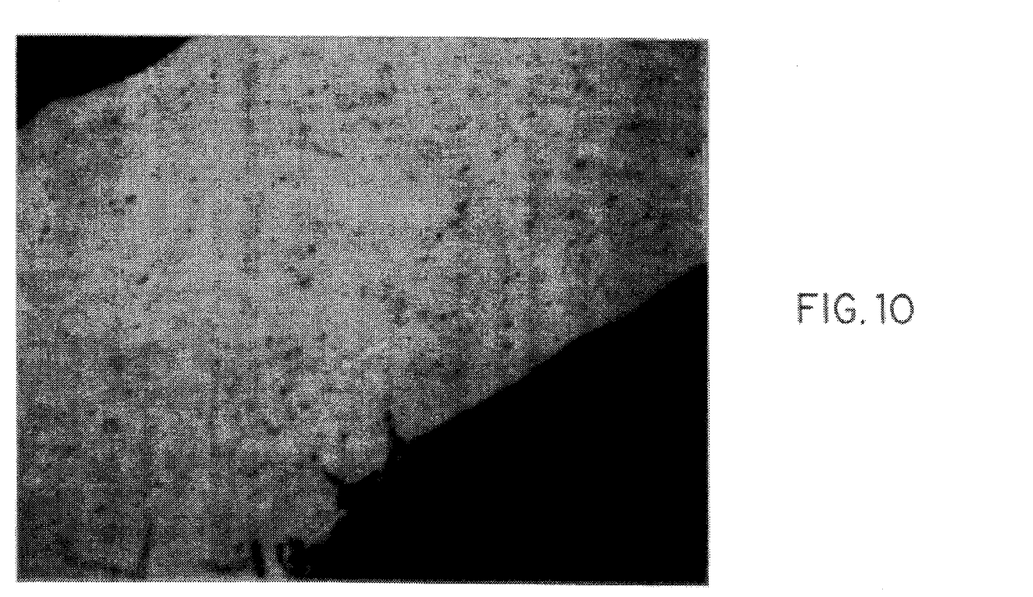
Figure 11:
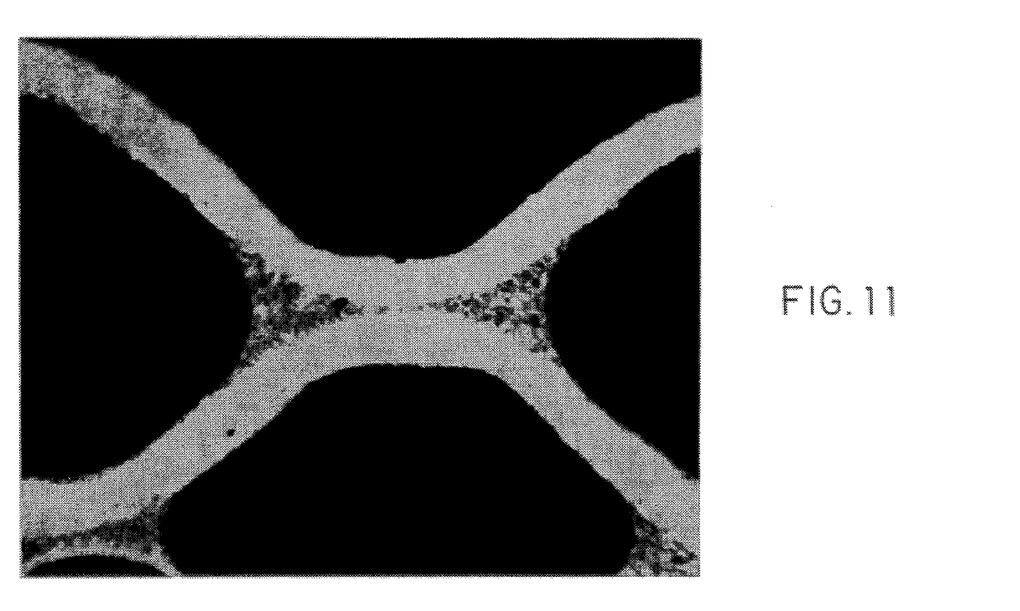
Figure 12:
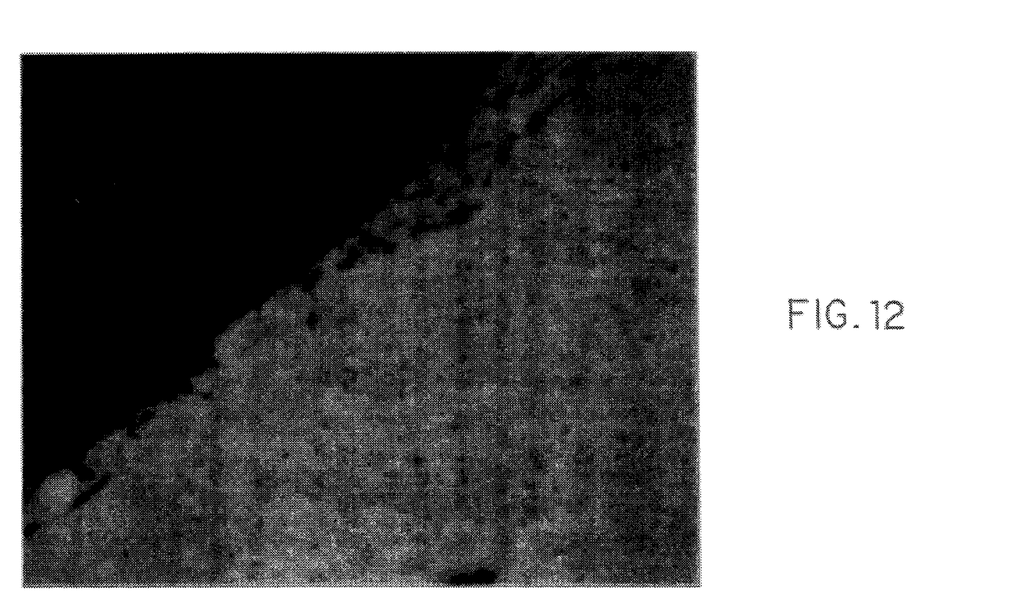

Acid immersion tests were then conducted, in accordance with that described above, on an evaporator unit formed from the alloy of this invention and an evaporator unit made from the Anthony alloy, processed in an essentially identical manner. The results are presented in FIGS. 5 through 12, in which FIGS. 5 and 6 are 20× and 160× microphotographs, respectively, of the Anthony alloy after 24 hours of testing; FIGS. 7 and 8 are 20× and 160× microphotographs of the Anthony alloy after 48 hours of testing; FIGS. 9 and 10 are 20× and 160× microphotographs of the alloy of this invention after 24 hours of testing; and FIGS. 11 and 12 are 20× and 160× microphotographs of the alloy of this invention after 48 hours of testing. From the microphotographs, it is very apparent that Anthony's alloy showed extensive corrosion after 24 and 48 hours of testing, while corrosion was absent from the alloy of this invention. The above clearly illustrates that the presence of free boron in the alloy of this invention significantly increases corrosion resistance, even when processed under conditions which favor intergranular corrosion.

From the above, it can be seen that the advantages associated with an aluminum alloy brazing stock material which incorporates the preferred aluminum alloy core material of this invention can be characterized in terms of the presence of free boron in the core alloy, in addition to the relatively higher copper concentration and lower manganese concentration as compared to conventional core alloys which are employed for use in a tubeplate-and-center type automotive air conditioning evaporator unit. The elemental constitution of the aluminum alloy core material of this invention sufficiently cooperates to provide a brazing stock material which exhibits enhanced corrosion resistance that is sufficient to withstand not only a hostile environment, but also the thermal cycling which occurs over the life of an air conditioning evaporator unit. The presence of free boron in the core alloy, as a result of relatively high levels of boron and a substantially reduced amount of titanium in the core alloy, advantageously serves to inhibit the formation of Cu—Al precipitates at the grain boundary of the alloy as a result of the affinity which free boron has for preferentially segregating at the alloy's grain boundaries. Yet the levels at which boron is present has a minimal effect on the strength, formability and brazeability of the core alloy, with strength being important in terms of the ability of the evaporator unit to withstand the pressure and thermal cycling encountered by an evaporator unit within an automotive air conditioning system.

While our invention has been described in terms of a preferred embodiment, it is apparent that other forms could be adopted by one skilled in the art. For example, those skilled in the art could apply the teachings of this invention to other 3000 series aluminum alloys, or modify the preferred aluminum core alloy within the preferred ranges of element concentrations, or clad the core alloy with a substitute braze alloy, or modify the processing steps or evaporator design employed. Accordingly, the scope of our invention is to be limited only by the following claims.

The embodiments of the invention in which an exclusive property or privilege is claimed are defined as follows:

1. An aluminum alloy brazing stock material for an automotive air conditioner evaporator, the aluminum alloy brazing stock material comprising:

an aluminum alloy core layer consisting essentially of the following, by weight, up to about 0.2 percent silicon, up to about 0.4 percent iron, from about 0.4 to about 0.5 percent copper, from about 0.5 to about 0.9 percent manganese, from about 0.2 to about 0.6 percent magnesium, and about 0.003 to about 0.04 percent boron, with the balance being substantially all aluminum with permissible trace amounts of ordinarily present elements, wherein zirconium, chromium, vanadium and titanium are present at impurity levels of below about 0.008 percent such that the boron within the aluminum alloy core layer yields free boron in sufficient amounts to inhibit the precipitation of copper-rich phases at the grain boundaries of the aluminum alloy core layer; and a layer of an aluminum-silicon brazing alloy which is clad on at least one surface of the aluminum core layer;

whereby the resistance of the aluminum alloy brazing stock material to intergranular corrosion is enhanced by the presence of the free boron within the aluminum alloy core layer, as a result of the free boron serving to inhibit precipitation of copper-rich phases at the grain boundaries of the aluminum alloy core layer.

2. An aluminum alloy brazing stock material as recited in claim 1, wherein the aluminum alloy core layer has two surfaces which are each clad with a layer of the aluminum-silicon brazing alloy.

3. An aluminum alloy brazing stock material as recited in claim 1, wherein the thickness of each of the layers of aluminum-silicon brazing alloy constitutes about ten percent of the total thickness of the aluminum alloy brazing stock material.

4. An aluminum alloy brazing stock material as recited in claim 1, wherein the aluminum-silicon brazing alloy is characterized by a melting range of about 1070° F. to about 1100° F.

5. An aluminum alloy brazing stock material for an automotive air conditioner evaporator, wherein the aluminum alloy brazing stock material has an aluminum alloy core layer clad between layers of an aluminum-silicon brazing alloy, the aluminum alloy core layer consisting essentially of the following, by weight:

up to about 0.15 percent silicon;

up to about 0.3 percent iron;

from about 0.4 to about 0.5 percent copper;

from about 0.7 to about 0.8 percent manganese;

from about 0.5 to about 0.55 percent magnesium;

from about 0.003 to about 0.024 percent boron; and the balance substantially being aluminum with trace amounts of ordinarily present elements, with zirconium, chromium, vanadium and titanium being present at impurity levels of below about 0.008 percent such hat the boron present within the aluminum alloy core layer yields free boron in sufficient amounts to inhibit the precipitation of copper-rich phases at the grain boundaries of the aluminum alloy core layer;

whereby the resistance of the aluminum alloy brazing stock material to intergranular corrosion is enhanced by the presence of the free boron within the aluminum alloy core layer, as a result of the free boron serving to inhibit precipitation of copper-aluminum compounds at the grain boundaries of the aluminum alloy core layer.

6. An aluminum alloy brazing stock material as recited in claim 5, wherein the thickness of each of the layers of aluminum-silicon brazing alloy constitutes about ten percent of the total thickness of the aluminum alloy brazing stock material.

7. An aluminum alloy brazing stock material as recited in claim 5, wherein the aluminum-silicon brazing alloy is an aluminum-silicon eutectic brazing alloy characterized by a melting range of about 1070° F. to about 1100° F.

8. A method for forming an automotive air conditioner evaporator, the method comprising the steps of: aluminum alloy brazing stock material comprising:

stamping portions of the automotive air conditioner evaporator from an aluminum alloy brazing stock material, the aluminum alloy brazing stock material comprising an aluminum alloy core layer which is clad on at least one surface with a layer of an aluminum-silicon brazing alloy; and brazing the portions together in a vacuum to form the automotive air conditioner evaporator;

the improvement wherein the aluminum alloy core layer consists essentially of the following by weight:

up to about 0.15 percent silicon;

up to about 0.3 percent iron;

from about 0.4 to about 0.5 percent copper;

from about 0.7 to about 0.8 percent manganese;

from about 0.5 to about 0.55 percent magnesium;

from about 0.003 to about 0.024 percent boron; and the balance substantially being aluminum with trace amounts of ordinarily present elements, with zirconium chromium and vanadium being present at impurity levels of below about 0.008 percent such that the boron present within the aluminum alloy core layer yields free boron in sufficient amounts to inhibit the precipitation of copper-rich phases at the grain boundaries of the aluminum alloy core layer;

whereby the resistance of the automotive air conditioner evaporator to intergranular corrosion is enhanced by the presence of the free boron within the aluminum alloy core layer, as a result of the free boron serving to inhibit precipitation of copper-aluminum compounds at the grain boundaries of the aluminum alloy core layer.

9. A method for forming an automotive air conditioner evaporator as recited in claim 8, wherein the thickness of each layer of the aluminum-silicon brazing alloy constitutes about ten percent of the total thickness of the aluminum alloy brazing stock material.

10. A method for forming an automotive air conditioner evaporator as recited in claim 8, wherein the aluminum-silicon brazing alloy is an aluminum-silicon eutectic brazing alloy characterized by a melting range of about 1070° F. to about 1100° F.

* * * * *